United States Patent [19]

Serafino et al.

[11] 4,187,326

[45] Feb. 5, 1980

[54] DRY BEVERAGE MIX CONTAINING A CLOUDING AGENT

[75] Inventors: James M. Serafino, Stamford, Conn.; Slawko Yadlowsky, Manville; John S. Witzeman, Rivervale, both of N.J.

[73] Assignee: General Foods Corporation, White Plains, N.Y.

[21] Appl. No.: 844,686

[22] Filed: Oct. 25, 1977

[51] Int. Cl.² .............................................. A23L 2/00
[52] U.S. Cl. ..................................... 426/590; 426/658
[58] Field of Search ............... 426/590, 531, 654, 658

[56] References Cited

U.S. PATENT DOCUMENTS

| | | | |
|---|---|---|---|
| 3,658,552 | 4/1972 | Carlson et al. | 426/531 |
| 4,022,924 | 5/1977 | Mitchell et al. | 426/590 |
| 4,081,567 | 3/1978 | Haber | 426/590 |

OTHER PUBLICATIONS

Thomas E. Furia ed., "Handbook of Food Additives," 1968, p. 39.

Primary Examiner—Alvin E. Tanenholtz
Assistant Examiner—Elizabeth A. Hatcher
Attorney, Agent, or Firm—Daniel J. Donovan; Richard Kornutik

[57] ABSTRACT

This invention relates to a clouding agent obtained by drying an aqueous dispersion comprised of, on a dry basis, a major amount of malto dextrin (in solution) and minor amounts of xanthan gum and titanium dioxide. The clouding agent thus obtained is added to a dry beverage mix in amounts effective to produce the desired opacity and remain suspended for a time sufficient to consume a beverage prepared from the dry mix.

9 Claims, No Drawings

DRY BEVERAGE MIX CONTAINING A CLOUDING AGENT

BACKGROUND OF THE INVENTION

The present invention relates to beverages, especially fruit flavored beverages wherein a desired quality is opacity.

In the art of the formulation of dry mix fruit juice beverages, there is a continuing effort being made to duplicate a counterpart natural fruit juice as closely as possible. The imitation beverage must have the mouth-feel, opacity, color and flavor characteristics of a natural juice. These desirable characteristics must be evident from the time of preparation of the aqueous beverage from the dry mix to the time of consumption. In many cases the beverage is not consumed for periods of time up to 48 hours subsequent to preparation. While stability after reconstitution is critical, it is equally important that the powderous dry beverage mix be storage stable for extended periods of time (i.e., in excess of 90 days) under adverse conditions (i.e., temperature 100° F. and relative humidity 90%).

An attempt at achieving the desired property of opacity or cloud inherent in natural fruit juice is described in U.S. Pat. No. 3,023,106 to Common. Therein is described a dried emulsion incorporating a plastic fat which is added to a dry beverage mix. The term "plastic fat" is described to cover a fat which is semi-solid at room temperature, that is, a product which is a mixture of fats and oils at temperatures in the order of 60° F. The plastic fat may be compounded by any one of a number of means such as by hardening through hydrogenation of vegetable oils or may comprise a blend of such fats and oils. Typically coconut oil may be hydrogenated to give a semi-solid material having a Wiley melting point of 98° F., a capillary melting point of 104° F., an iodine value of 5.2, a saponification number of approximately 253 and a solids content index of 43% at 20° C. To this material is added 6% stearin to yield a partially solidified fat having a Wiley melting point of 111° F., a capillary melting point of 116° F., an iodine value of 2.2, a saponification number of approximately 254 and a solids content index of from 48–50% solids at a temperature of 20° C.

Another attempt at producing a clouding agent was set out in U.S. Pat. No. 3,658,522 to Carlson. The concept of a plastic fat emulsion system of Common was improved upon by providing for the incorporation of one or more inorganic whitening pigments, typically titanium dioxide, in a clouding system comprising a plastic fat and a hydrophilic colloidal material. Carlson typically spray dries a solution of gum Arabic, hydrogenated coconut oil and titanium dioxide to obtain a dry, flowable, powderous clouding agent which is subsequently incorporated in a dry beverage mix.

A major drawback of prior cloud systems relates to their inclusion of the plastic fat itself in the cloud system. Several detrimental effects are manifested due to the fat and result ultimately in problems of clumping of the dry mix and insolubility of the mix when reconstitution is attempted. First, the oil may be poorly fixed, that is an excess of free oil will be present in the cloud system. Second, in the blending process when the cloud is mixed with the other ingredients of the dry beverage mix ingredients, considerable mechanical work is performed (typically in 2,000 pound capacity ribbon blenders). The mechanical attrition and grinding will liberate oil from its fixative agent. A third undesirable effect is caused by temperature which may be due to both mechanical shear during mixing and ambient conditions. A fourth effect is provided by excessive moisture which may be due to excessively humid ambient conditions and the addition of liquid color to the dry mix. Thus, there are various influences which tend to liberate oil during processing. Since the oil is water insoluble, aqueous reconstitution is incomplete.

Another problem associated with the use of oil in a clouding agent is off-taste. The oxidated rancidity and alkaline hydrolysis of the oil result in a undesirable soapy taste. This type of problem is further compounded in that discovery of the off-taste in many instances is not made until after the product has been in the stream of commerce for a considerable period of time.

In view of the foregoing, it would be highly desirable if a simple method were devised whereby a cloud system for dry beverage mixes could be obtained which does not contain fat.

SUMMARY OF THE INVENTION

It is an object of the present invention to provide a clouding agent for dry beverage mixes and particularly imitation fruit juice mixes which have the opacity and mouth-feel of natural juices. Typically these imitation fruit juices have a pH of below about 4.5. It is another object of this invention that the cloud system be storage stable for extended periods of time. Still another object is to provide a clouding agent which is readily soluble in cold water. Generally this invention allows the use of titanium dioxide in a cloud system which is free from oil.

These and other objects are accomplished according to the present invention by preparing a dry clouding agent for dry beverage mixes by co-drying an aqueous mixture containing a major amount of solubilized malto dextrin with minor amounts of xanthan gum and dispersed titanium dioxide.

DETAILED DESCRIPTION OF THE INVENTION

The term opacity as used in this invention relates to the level of light transmittance of an aqueous solution. A laboratory instrument such as a Bausch and Lomb Spec 20 (TM) is used to measure such light transmittance levels.

The clouding agent of this invention is prepared by dispersing and co-drying solubilized malto dextrin, xanthan gum and dispersed titanium dioxide to produce a dry powder which manifests a clouding effect when incorporated in an artificial beverage.

Various malto dextrins (hydrolyzed cereal solids) which are starch hydrolysates produced by converting pure refined corn starch into nutritive saccharides through the use of acids or specific enzymes. The carbohydrate composition of malto dextrin is arranged to yield a DE (dextrose equivalent) of less than 20. They are typically bland in flavor and without appreciable sweetness. Preferably, the malto dextrin as used in the instant invention will have a dextrose equivalent of between 10 and 20. As used herein, the malto dextrin sold under the trademark Fro-Dex$^{(TM)}$15 by the American Maize-Products Company has been found most preferable. It is a white free-flowing powder extremely bland in taste with little or no sweetness. Additionally, it has a quality of contributing a slight opacity to the clouding composition.

| TYPICAL CHEMICAL AND PHYSICAL DATA OF FRO-DEX(TM)15 | |
|---|---|
| % Moisture | 4.5 |
| Dextrose Equivalent | 18. |
| SO₂ (M.W.) | 40 ppm |
| pH (1:1) | 4.5 |
| Weight Per Cu. Ft. (approx.) | 36 lbs. |
| Carbohydrate Composition (Approx. % D.B.) | |
| Monosaccharides | 3 |
| Disaccharides | 2 |
| Trisaccharides | 2 |
| Tetrasaccharides | 2 |
| Pentasaccharides & higher | 91 |
| Screen Analysis (average %) | |
| On 40 | nil. |
| On 100 | .4 |
| On 200 | 14.0 |
| Thru 200 | 85.6 |

The xanthan gum as used in this invention is a high molecular weight natural carbohyrate or more specifically polysaccharide. Xanthan gum defines the exocellular biopolysaccharide which is produced in a pure culture fermentation process by the microorganism xanthomonas campestris.

An important functional quality of the xanthan gum is its ability to control aqueous fluid rheology. Water solutions of xanthan gum are extremely pseudoplastic; when shear stress is applied, viscosity is reduced in proportion to the amount of shear once the yield point has been exceeded. Upon release of the shear, total viscosity recovery occurs almost instantaneously. Another attribute of xanthan gum that makes it useful as a suspension stabilizer is that it not only has a yield value but also a viscosity which is almost independent of temperature and pH. A particular xanthan gum found most useful in the practice of this invention is sold under the trademark Keltrol(TM)F available from Merck & Company.

| TYPICAL PHYSICAL PROPERTIES KELTROL(TM)F | |
|---|---|
| Physical State | Dry, cream-colored powder |
| Moisture Content | 11% |
| Ash | 9% |
| Color | 70 |
| Specific Gravity | 1.5 |
| Bulk Density (lbs./cu. ft.) | 52.2 |
| Browning Temperature, °C. | 165 |
| Charring Temperature, °C. | 240 |
| Ashing Temperature, °C. | 470 |
| As a 1% Solution (distilled water): | |
| Heat of Solution (cal./g.soln) | 0.080 |
| Refractive Index (20° C.) | 1.3338 |
| pH | 7.0 |
| Surface Tension (dynes/cm) | 75 |
| Freezing Point, °C. | 0.0 |
| 1% Viscosity (60 rmp, Brookfield LVF) | |
| (with 1% electrolyte added) | 1400 cps |
| Mesh Size | 200 |

Titanium dioxide as used herein is preferably a purified inorganic white, named by the 1971 Colour Index, pigment white 6, C.I. 77891. It is available from H. Kohnstamm & Company and typically has the following characteristics.

| TITANIUM DIOXIDE TECHNICAL DATA | |
|---|---|
| Crystal Type | Anatase |
| Specific Gravity | 3.9 |
| Pounds per Solid Gallon | 32.5 |
| 1 Pound Bulks, Gals. | .0308 |
| Minimum TiO₂ | 99% |
| Spatula Water Absorption | 30 lbs. water/100 lbs. Pigment |
| Spatula Oil Absorption | 20–22 lbs. oil/100 lbs. Pigment |
| Average Particle Diameter | 0.3 Microns |
| Screen Test | 99% Through 325 Mesh Screen 100% Through 200 Mesh Screen (CTFA Method C 6-1, Wet Screening) (ASTM D-185-45 |

The cloud composition of the instant invention is preferably added to constituent ingredients necessary to formulate a dry beverage mix. Therefore, unless otherwise indicated all percentages herein referred to will be in relation to the total dry mix (as in the instant example) composition. Thus, the malto dextrin may be present in the range of 0.5% to 5.0% by weight of the total dry mix composition. Preferably the range will be 1.5% to about 2.0%. The xanthan gum will be present in the range between 0.01% and about 0.1% by weight of the dry mix composition. Preferably the xanthan will be present in the amount of 0.015% to about 0.035% by weight of the dry weight mix composition. The titanium dioxide will be present in amounts between .01% and 0.1% by weight of the dry mix composition, and preferably between 0.025% and 0.075%. Preferably the titanium dioxide will be finely divided say 0.1 micron to about 0.7 microns in particle size.

A number of unexpected results arise from the combination of the three components of the instant clouding composition. Most importantly it has been found that it is critical that the titanium dioxide be added to an aqueous solution of malto dextrin and xanthan gum and the resultant suspension be dried concurrently or co-dried. The combination of each component by mixing in its dry form does not have utility. The titanium dioxide immediately begins to precipitate when the mix is put in a beverage. Likewise, co-drying titanium dioxide with either malto dextrin or xanthan gum separately does not work. The titanium dioxide again immediately precipitates when used in a beverage. Surprisingly the co-dried combination permits a cloud which is useful in a beverage for periods of at least 24 hours and preferably at least 48 hours when the beverage is stored at 50° F.

Another unexpected result of the instant invention relates to the amount of xanthan gum necessary to contribute the desired mouth-feel (viscosity) in an artificial fruit beverage. Conventionally, carboxy methyl cellulose is used in the amount of 0.46% by weight of the dry beverage mix composition to impart the desired effect. Direct replacement of carboxy methyl cellulose has been found to require the xanthan gum in the amount of about 0.13% by weight of the dry mix. It has been found that on a comparative basis when xanthan gum is contained within the composition of the instant invention that only about one-third the amount by weight of the dry mix of xanthan gum is needed for equivalency of the desired viscosity/mouth-feel characteristics. Another unexpected result is that two particular levels of malto dextrin have been identified as being most effective. Those levels are 1.75% and 3.00% of malto dextrin by weight of the dry beverage mix. Thus, while levels of malto dextrin of between 0.5 and 5.0% by weight of the dry mix are effective, the unexpected benefits displayed by this invention are most evident at the two specific levels identified.

In the preparation of the product of this invention, it is preferable to use a vessel which has provision for mixing under high shear. Additionally, the malto dextrin and xanthan gum will solubilize more quickly if the aqueous system is heated preferably to about 150° F. The higher temperatures may be used, but in no case should they exceed the boiling point of the composition. The resultant solution or suspension is then maintained at an elevated temperature in preparation for drying. Most advantageous due to process cost and volume considerations is the utilization of a spray dryer to evaporate the water from the aqueous mixture and thus obtain a powderous clouding agent from the co-dried ingredients. Those skilled in the art will recognize that other methods of drying may be employed such as freeze drying, vacuum drying, etc. Typically in spray drying, the product will be fed to the drying tower by means of a pump such as a Manton-Gaulin under working pressures of between 500 psi and 3,000 psi. Such pressures inflict additional shearing force on the mixture and further serve to homogenize and reduce the particle size of the product.

The dried cloud ingredients are typically mixed with other beverage materials such as tartaric acid, citric acid or other food acids, sugars such as sucrose, dextrose, fructose and the like, artificial sweeteners, suitable coloring agents such as orange coloring, cherry coloring, grape coloring and the like, fruit flavors such as orange, grape, lemon, lime and the like and other art recognized beverage additives.

The invention is more fully described but not limited by the following examples.

EXAMPLE 1

To prepare the cloud according to the preferred embodiment of this invention, the following procedure is followed.

To a high shear planetary-type mixture is added a pre-blended dry mix of 958.9 pounds of malto dextrin sold under the trademark Fro-Dex(TM)15 available from American Maize-Products Company and 13.7 pounds of xanthan gum sold under the trademark Keltrol(TM)F available from Merck and Company and 290 gallons of water with constant mixing. To the resulting solution is added 27.4 pounds of food grade titanium dioxide. During the mixing the temperature of the solution is elevated to about 150° F. Next the mixer speed is increased to maximum speed and sheer and is maintained for a 15 minute period. The product is then transferred to a separate holding tank preparatory to spray drying. The mixture enters the spray drying tower by means of passage through a two stage Manton Gaulin positive displacement pump. The first stage and second stage are operated at 2000 psi pressure and 3000 psi pressure, respectively. The solution enters the upper portion of the drying tower through a series of spray nozzles. The inlet air temperature of the drying tower is about 400°. The exit air temperature in the lower portion of the tower is about 190° F. The product exiting the bottom of the tower is a dry flowable powder having a moisture content below about 5%.

EXAMPLE 2

A fruit flavored beverage mix is prepared employing the cloud prepared as in Example 1 and in accordance with the following formulation:

| Beverage Mix A | |
|---|---|
| Ingredient | Percent |
| Sugar | 88.522 |
| Citric Acid | 5.318 |
| Cloud* | 1.825 |
| Flavor and Flavor Enhancers | 1.143 |
| Monocalcium Phosphate | 1.137 |
| Potassium Citrate | 0.780 |
| Dry Calcium Phosphate | 0.664 |
| Vitamin C | 0.511 |
| Carboxymethylcellulose | 0.460 |
| Vitamin A | 0.036 |
| Color | 0.028 |
| | 100.000 |
| *Cloud | |
| Malto Dextrin (Fro-Dex 15(TM)) | 95.89 |
| Xanthan Gum (Keltrol (TM)) | 1.37 |
| Titanium Dioxide | 2.74 |
| | 100.000 |

For comparison, a conventional fruit flavored beverage mix is prepared in accordance with the following formulation:

| Beverage Mix B | |
|---|---|
| Ingredient | Percent |
| Sugar | 88.309 |
| Citric Acid | 5.381 |
| Cloud* | 1.574 |
| Monocalcium Phosphate | 1.137 |
| Potassium Citrate | 0.780 |
| Tricalcium Phosphate | 0.664 |
| Vitamin C | 0.511 |
| Flavor and Flavor Enhancers | 1.143 |
| Carboxymethylcellulose | 0.500 |
| Vitamin A | 0.036 |
| Color | 0.028 |
| | 100.000 |
| *Cloud | |
| Modified Starch | 76.440 |
| Hydrogenated Coconut Oil | 19.600 |
| Titanium Dioxide | 1.960 |
| Tricalcium Phosphate | 2.000 |
| | 100.000 |

Thirty-three grams of Beverage Mix B is reconstituted in 8 ounces of water and produced a beverage with an opacity reading of 60 on a Bausch Lomb Spec 20 opacity meter.

Thirty-three grams of the above Beverage Mix A is reconstituted in 8 ounces of water. The opacity is the same as that of the Beverage Mix B. Additionally the body and mouth feel of the beverage of A and that of B are judged equivalent by an expert panel.

The product of Beverage Mix B after being reconstituted in 50° F. water and held at that temperature for 24 hours displayed precipitation of the cloud system. Titanium dioxide came out of solution and settled at the bottom of the sample flask with an attendant reduction in opacity. The product of Beverage Mix A has no apparent precipitation or change in opacity after 24 hours at 50° F. Additionally the product of Beverage Mix A is readily dispersible in cold water and does not display the clumping or streaking problems associated with beverages mixes which have oil.

What is claimed is:

1. A fruit flavored dry beverage mix which comprises sugar, food acid, flavor and color wherein the improvement comprises a dry clouding agent which is obtained by co-drying an aqueous dispersion comprised of, on a dry basis, a major amount of solubilized malto dextrin and a minor amount of xanthan gum and titanium dioxide whereby the total dry beverage mix is storage stable and the reconstituted beverage obtained from the total dry mix has properties resembling the opacity and mouth-feel of a natural fruit juice and retains said opacity and mouth-feel for at least 24 hours when held at 50° F.

2. A fruit flavored dry beverage mix of claim 1 wherein malto dextrin comprises about 0.5% to about 5.0% by weight of the total dry beverage mix composition.

3. A fruit flavored dry beverage mix of claim 2 wherein malto dextrin comprises about 1.5% to about 2.0% by weight of the total dry beverage mix composition.

4. A fruit flavored dry beverage mix of claim 1 wherein xanthan gum comprises about 0.01% to about 0.1% by weight of the total dry beverage mix composition.

5. A fruit flavored dry beverage mix of claim 4 wherein xanthan gum comprises between about 0.15% to about 0.035% by weight of the total dry beverage mix composition.

6. A fruit flavored dry beverage mix of claim 1 wherein titanium dioxide comprises about 0.01% to about 0.1% by weight of the total dry beverage mix composition.

7. A fruit flavored dry beverage mix of claim 6 wherein the titanium dioxide comprises about 0.025% to about 0.075% by weight of the total dry beverage mix composition.

8. A fruit flavored dry beverage mix of claim 1 wherein the titanium dioxide is finely divided.

9. A fruit flavored dry beverage mix of claim 1 wherein the food acid is present in the dry beverage mix in an amount sufficient to produce a pH of less than 4.5 in 8 ounces of the reconstituted beverage.

* * * * *